United States Patent
Weeks

(10) Patent No.: US 10,255,363 B2
(45) Date of Patent: Apr. 9, 2019

(54) REFINING SEARCH QUERY RESULTS

(71) Applicant: TD Ameritrade IP Company, Inc., Omaha, NE (US)

(72) Inventor: Andrew Weeks, Omaha, NE (US)

(73) Assignee: TD Ameritrade IP Company, Inc., Omaha, NE (US)

(*) Notice: Subject to any disclaimer, the term of this patent is extended or adjusted under 35 U.S.C. 154(b) by 247 days.

(21) Appl. No.: 13/964,483

(22) Filed: Aug. 12, 2013

(65) Prior Publication Data
US 2015/0046423 A1 Feb. 12, 2015

(51) Int. Cl.
G06F 17/30 (2006.01)

(52) U.S. Cl.
CPC .. G06F 17/30864 (2013.01); G06F 17/30867 (2013.01); G06F 17/30899 (2013.01)

(58) Field of Classification Search
CPC ......... G06F 17/30867; G06F 17/30864; G06F 17/3053; G06F 17/30657; G06F 17/30716; G06F 17/30899; G06Q 30/0257
See application file for complete search history.

(56) References Cited

U.S. PATENT DOCUMENTS

| | | | |
|---|---|---|---|
| 6,567,812 B1* | 5/2003 | Garrecht | G06F 17/30991 707/708 |
| 7,698,261 B1 | 4/2010 | Khoshnevisan | |
| 8,407,211 B1* | 3/2013 | Lewis | G06F 17/30241 707/706 |
| 8,676,777 B1* | 3/2014 | Prahladka | G06F 17/3053 707/703 |
| 9,569,797 B1* | 2/2017 | Rohn | G06Q 40/025 |
| 2002/0169764 A1* | 11/2002 | Kincaid | G06F 17/30713 |
| 2003/0018659 A1* | 1/2003 | Fuks | G06F 17/30646 715/230 |
| 2004/0260677 A1 | 12/2004 | Malpani et al. | |
| 2005/0171940 A1* | 8/2005 | Fogg | G06F 17/30554 |
| 2006/0100998 A1* | 5/2006 | Edwards | G06F 17/30654 |
| 2007/0005413 A1* | 1/2007 | Hennings et al. | 705/9 |

(Continued)

OTHER PUBLICATIONS

Visualizing the Results of Interactive Queries for Geographic Data on Mobile Devices, Burigat et al., GIS'05, pp. 277-284, 2005.*

(Continued)

Primary Examiner — Augustine K. Obisesan
(74) Attorney, Agent, or Firm — Harness, Dickey & Pierce, P.L.C.

(57) ABSTRACT

Systems and methods for refining search query results are provided. A first user input is received. A plurality of search categories for the first input are determined. The plurality of search categories are then associated with different segments of a first slider. The first slider allows a user to generate a search query for the first user input among the plurality of associated categories. The search query returns a set of search query results. A plurality of sub categories may be determined for each search category. The plurality of sub-categories are associated with different segments of a second slider. Movement of a slider button of a second slider to a first segment of the second slider may be detected. The search query results may be filtered based on the first segment of the second slider. The filtering adjusts a level of detail of the set of search query results.

39 Claims, 10 Drawing Sheets

(56) References Cited

U.S. PATENT DOCUMENTS

| | | | |
|---|---|---|---|
| 2007/0078828 A1* | 4/2007 | Parikh | G06F 17/30867 |
| 2007/0143264 A1* | 6/2007 | Szeto | G06F 17/30643 |
| 2007/0192300 A1* | 8/2007 | Reuther | G06F 17/30427 |
| 2008/0140577 A1* | 6/2008 | Rahman et al. | 705/71 |
| 2008/0140637 A1 | 6/2008 | Kumar | |
| 2008/0147606 A1* | 6/2008 | Read | G06F 17/30873 |
| 2008/0155464 A1* | 6/2008 | Jones | G06F 3/0481 715/787 |
| 2008/0189645 A1* | 8/2008 | Kapanen et al. | 715/777 |
| 2008/0244429 A1* | 10/2008 | Stading | 715/764 |
| 2008/0249798 A1* | 10/2008 | Tulshibagwale | G06Q 30/02 705/1.1 |
| 2008/0294624 A1* | 11/2008 | Kanigsberg | G06F 17/30867 |
| 2009/0100455 A1* | 4/2009 | Frikker | G06F 17/30032 725/13 |
| 2009/0144262 A1* | 6/2009 | White | G06F 17/30389 |
| 2010/0005069 A1* | 1/2010 | Wang | G06F 17/30867 707/E17.108 |
| 2010/0036802 A1* | 2/2010 | Tsuruta | G06Q 30/0603 707/722 |
| 2010/0076960 A1* | 3/2010 | Sarkissian | G06F 17/30867 707/722 |
| 2010/0114878 A1* | 5/2010 | Lu | G06F 17/30675 707/723 |
| 2010/0299342 A1* | 11/2010 | Gustafson | G06F 17/30864 707/759 |
| 2011/0093488 A1* | 4/2011 | Amacker | G06F 17/30873 707/767 |
| 2011/0184956 A1* | 7/2011 | Dantsker | G06F 17/30864 707/741 |
| 2012/0054669 A1* | 3/2012 | Refuah et al. | 715/783 |
| 2012/0078936 A1 | 3/2012 | Kuo et al. | |
| 2012/0102013 A1* | 4/2012 | Martini | G06F 17/3087 707/706 |
| 2012/0185476 A1* | 7/2012 | Ullman | G06Q 30/0625 707/732 |
| 2012/0259846 A1* | 10/2012 | Rafsky | G06F 17/30867 707/723 |
| 2012/0330962 A1 | 12/2012 | Huang et al. | |
| 2014/0258285 A1* | 9/2014 | Lavine | G06F 17/30554 707/728 |

OTHER PUBLICATIONS

International Search Report and Written Opinion of the Searching Authority directed to related International Patent Application No. PCT/US2013/060647, European Patent Office, Rijswijk, Netherlands, dated Jun. 25, 2014; 16 pages.

Mary Lou, "How to Create a Simple Multi-Item Slider," Dec. 31, 2012, retrieved from the Internet at: http://web.archive.org/web/20130103163310/http://tympanus.net/codrops/2012/12/31/how-to-create-a-simple-multi-item-slider [retrieved on Feb. 17, 2014]; 12 pages.

"ZoneAlarm Help from Don Hoover," Mar. 21,2013, retrieved from the Internet at http://web.archive.org/web/20130321234704/http://zonealarm.donhoover.net/main3.html [retrieved on Jun. 13, 2014]; 4 pages.

* cited by examiner

REFINING SEARCH QUERY RESULTS

TECHNICAL FIELD

Embodiments are generally related to an application or service that refines search query results.

BACKGROUND

The search input field of a search engine or searchable database system is generally used to generate a URL request or a search query. Typically, within the search input field, a user enters one or more search terms or parameters for which they would like to generate a set of search query results. For example, the search query results can include information related to the search terms, such as links to relevant websites if it is a browser-based search of the internet or links to customer related data, if it is a database management search for a business. In response to the search query, a request message is generated and sent to one or more servers storing the contents related to the search query. Each server may then send back a response message which includes the related contents. Upon receipt of the response messages, the search engine or searchable database system reads the contents of each response message and formats the related content as a list of search query results which is displayed to the user. The list of search results can include a list of suggested URLs or a list of suggested customer records, for example. In order to refine or adjust searches, a user typically has to modify the search parameters. This may be accomplished by providing "drop-down" combo boxes, which a user may select to limit the criteria for the search. Additionally, some search engines provide "Advanced Search" pages, which allow further limiting of the critera for the search.

BRIEF DESCRIPTION OF THE FIGURES

The accompanying drawings, which are incorporated herein and form a part of the specification, illustrate the present embodiments and, together with the description, further serve to explain the principles of the embodiments and to enable a person skilled in the pertinent art to make and use the embodiments of the disclosure.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
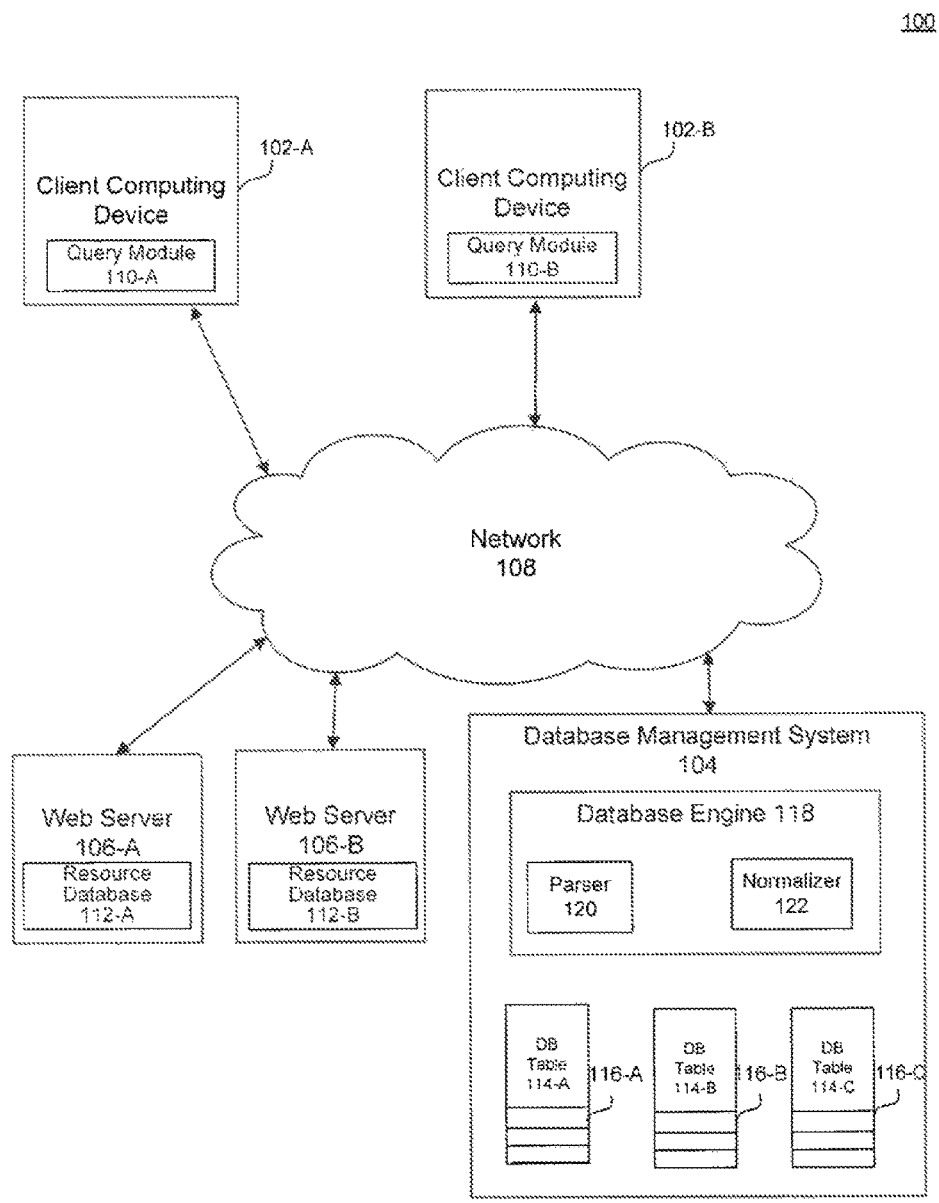
FIG. 1 is a diagram illustrating an example system, according to an embodiment.

In the detailed description of embodiments that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the search input field of a search engine or searchable database is useful for performing the functionality discussed above, users could benefit from increased functionality for producing search query results. For example, once a user receives a set of search query results, in order to refine or limit the search query results, the user is required to perform additional actions, such as navigating to additional web pages or changing the search query parameters or criteria and resubmitting additional search queries. The refinement of search query results normally requires the user to perform additional work which impacts efficiency and detracts from the overall user experience. Additionally, for users operating small mobile devices, performing a search and refinement of search query results can prove to be troublesome due to the small size of the display area. A system is provided herein that allows a user to refine search query results quickly and intuitively. Such a system allows a user to efficiently interact with and manipulate search query results without having to perform many additional actions.

In an example use of such a system or application, a user may begin to enter a first input in a search input field of a user interface, such as a website or searchable database system. The first input can be a string of text or characters. In response, the first input may be parsed and one or more categories may be determined for the first input. For example, for a financial institution which manages customer information via a database management system, the database system may be searched based on different categories of information. For example, such categories of information may include a category for "Accounts" and a category for "Securities." Each category of information may be stored within separate databases of a financial database system. Categories for the first input may be retrieved based on analysis of characteristics of the parsed input, according to an embodiment. Such analysis may look for certain types of characters or formatting of the characters, which may indicate a type for the first input. For example, a parsed input with a format such as "XXX-XX-XXXX," where X can be different integers, serves as an indication that the first input may be a social security number. Such analysis of the parsed input may be sent to a model which assigns a relevance score to each of the categories or databases within the global financial database system. Relevance scores are assigned to categories or databases based on a likelihood that information related to first input is stored in a category or an associated database. In the example above, categories or databases of the financial database system may be assigned relevance scores based on a likelihood that the categories or databases include information based on a customer's social security number.

Based on the relevance score, a plurality of search categories are selected. The plurality of search categories may be selected based on a pre-configured threshold. For example, a user or developer may configure the system such that categories with a relevance score above 75% are retrieved. Further details of the model and relevance scores are discussed below. The user interface of the search engine or searchable database may include a first slider. A slider is a search control mechanism which includes a slider button which may be moved by the user. For example, a slider may include a slider button which may be moved from left to right along the length of the slider. The retrieved plurality of results can be assigned to different segments of the first slider according to an embodiment. For example, if the first input entered by the user retrieved 5 searchable categories, the first slider may be partitioned into 5 separate segments, where there is a one-to-one mapping or link between a searchable category and a segment of the first slider.

With such a configuration, a user is allowed to generate and refine search query results among the categories assigned to the first slider. Thus, in an example use of the system, as a user enters a first input into the search input field, categories are simultaneously retrieved and assigned to the first slider. The names of the assigned categories are displayed along the length of the first slider, so that the user is aware of all the searchable categories which have been generated based on the first input. As a default setting, the slider button is positioned at the center of the first slider and, as a result, the search query results include information from all retrieved categories. As the user interacts with the first slider, the slider button may be moved to the left or right and the search query results will be refined based on the category associated with the position of the slider button.

In another embodiment, the system may include a second slider button which refines the search query results further. The second slider button may refine search results based on sub-categories associated with each category linked to the first slider. For example, in the example discussed above, a "Securities" category may include several sub-categories, such as "Debt Securities," "Equity Securities" and "Derivative Contracts." Each sub-category may be assigned to the second slider in the same manner that categories are assigned to the first slider. A user may then refine the level of detail of a list of search query results based on manipulating the second slider. As the user moves the second slider, the search query results can be filtered in order to display information based on the sub-category associated with the position of the slider button of the second slider.

It is noted that the embodiments are not limited to this example application, but are instead applicable to other applications as would be apparent to persons skilled in the art based on the teachings provided herein. Those skilled in the art with access to the teachings provided herein will recognize additional modifications, applications, and embodiments within the scope thereof and additional fields in which the embodiments would be of significant utility. For example, an individual may generate a web-based search query with the objective of retrieving a set of search query results, such as links to websites. In a similar manner discussed above, embodiments would present the user with a set of categories along the first slider. For a web-based search, such categories may include "News," "Scholarly Articles" and "Media." Based on the user's movement of the first slider, information from the different categories are presented to the user as the search query results. The user may further refine the search query results based on movement of the second slider. Thus, in the example above, for a "Media" category, subcategories such as "Pictures," "Video," and "Audio" may be assigned to the second slider and the user may filter the "Media" search query results based on movement of the slider button of the second slider.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

FIG. 1 illustrates a search engine system 100 which may be used for implementing embodiments. As illustrated, the search engine system 100 includes one or more client computing device(s) 102-A, 102-B, which are communicatively coupled to Database Management System ("DBMS") 104 and web-servers 106-A, 106-B via network 108. The described computer hardware and software are presented for purposes of illustrating the basic underlying client and server device components that may be utilized for implementing embodiments. For purposes of discussion, the following description will present examples in which it will be assumed that there exist multiple server instances (e.g., database server nodes) in a cluster that communicate with one or more "clients" (e.g., personal computers or mobile devices). The embodiments of the present disclosure, however, are not limited to any particular environment or device configuration. Instead, embodiments may be implemented in any type of system architecture or processing environment capable of supporting the methodologies presented herein.

Client computing devices 102 can include processor-based electronic devices that are manipulated by a user and are capable of requesting and receiving data from DBMS 104 and web-servers 106. Examples of client computing devices 102 include mobile communication devices and personal computers. Client computing devices 102 can include software, such as query modules 110-A, 110-B. Query modules 110 may be used to request data from DBMS 104 and web-server 106. For example, query modules 110 may be utilized to request data from web-servers 106, such as contents of a web page. The request for data from web servers 106 may be sent in response to a user entering and submitting a URL request within a navigation field provided by query module 110. In response to the request, web servers 106 are configured to deliver data within resource databases 112-A, 112-B to the client computing devices 102. Client computing devices 102 are configured to receive data from web servers 106 and display the data within a display window of client computing devices 102.

In another embodiment, client computing devices 102 can include one or more standalone terminals connected to DBMS 104 via network 108. A terminal can include one or more standalone workstations or personal computers. Client computing devices can be configured to operate under a client operating system. An operating system (OS) can include a collection of software that manages the hardware resources of client computing devices 102 and provides common services for computer programs or applications running on client computing devices 102.

In an embodiment, the DBMS 104, may be configured to manage data for a financial institution and generally operates as an independent process (i.e., independently of the client computing devices 102), by running under an operating system specifically tailored for DBMS 104.

Network 108 may be any network or combination of networks that can carry data communications. Such a network 108 may include, but is not limited to, a local area network, metropolitan area network, and/or wide area network such as the Internet. Network 108 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

In an embodiment, the network 108 includes functionality for packaging client calls in the Structured Query Language (SQL) together with a set of parameter information into a format (of one or more data packets) suitable for transmission to DBMS 140.

Data within DBMS 104 can be stored as a series of tables, such as database tables 114-A, 114-B, 114-C. In operation, client computing devices 102 are configured to send data to be stored in one or more database tables 114 or retrieve data from database tables 114. Each database table 114 can include one or more "rows" or "records" of data 116-A, 116-B, 116-C. In general DBMS 104 will include many database tables 114, each of which stores information about a particular type of entity. For example, for a financial institution which manages records for its customers, database tables 114 can include a record for each customer and customer information may span a plurality of database tables 114 depending on the structure and organization of the customer information by DBMS 104.

A row or record 116 of database tables 114 can be divided into fields or columns, where each field or column represents one particular attribute of the given record. For example, a row corresponding to a customer for a financial institution may include information about the customer's Social Security Number, First Name, Last Name, Date of Birth, and Customer ID Number. Each piece of the customer information, in turn, represents a database field. In the foregoing customer table, for example, Social Security Number is one field and Customer ID Number is another field. With this format, database tables 114 are easy for users to understand and use. Moreover, the flexibility of tables allows a user to define relationships between various items of data, as needed. Thus, a typical record includes several categories of information about an individual person, place, or thing. Each row in a table is uniquely identified by a record ID (RID), which can be used as a pointer to a given row.

As discussed above, a customer's information may span across a plurality of database tables 114 based on how the information is organized. For example, a financial institution may store information related to customer accounts in one database table 114 and information related to customer securities (i.e. tradable assets) in a separate database table 114.

DBMS 104 may be configured to implement the Structured Query Language (SQL), which is a database language allowing users and administrators to create, manipulate, and access data stored in DBMS 104. SQL statements are generally divided into two categories: data manipulation language (DML), used to read and write data; and data definition language (DDL), used to describe data and maintain DBMS 104. DML statements are also called search queries. In operation, for example, client computing devices 102 issue one or more SQL commands to DBMS 104, where the SQL commands may specify a search query for retrieving particular data (i.e., data records meeting the query condition) from the database tables 114.

SQL statements or "search queries" are parsed to determine an access plan (also known as "execution plan" or "query plan") to satisfy a given search query. In operation, the SQL statements received from the client computing devices 102 are processed by database engine 118 of DBMS 104. Database engine 118 comprises a parser 120 and a normalizer 122. Specifically, the SQL statements are passed to the parser 120 which employs conventional parsing methodology (e.g., recursive descent parsing). The parsed query is then normalized by the normalizer 122. Normalization includes, for example, the elimination of redundant data. Additionally, the normalizer 122 performs error checking, such as confirming that table names and column names which appear in the query are valid (e.g., are available and belong together). After normalization, the query is passed to an execution unit (not illustrated), which retrieves data from database tables 114 based on the parsed search query. Query modules 110 are configured to generate search queries and retrieve and refine search query results from both DBMS 104 and web servers 106, as described above. Further details of the operations of query module 110 will be discussed below.

Query modules 110 can be any kind of browser, browser extension or search engine mechanism, which allows for the searching of the internet or a database. Query module 110 may extend the functionality of client computing device 102 and can be configured to efficiently refine search query results. For example, query modules 110 may be a browser extension downloaded from a browser extension server (not shown) and installed on client computing device 102 as part of browser. Query modules 110 may be developed by an application developer for use on client computing device 102 or any other computing device. A programming language, such as JavaScript, may be used to develop query modules 110. Query modules 110 may then be stored locally on client computing devices 102.

Query modules 110, or any combination of their components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory, and user interface display.

Web servers 106 are computing devices or applications executing on computing devices that host resource databases 112. Each resource database 112 is associated with a domain name and hosted by the one or more web servers 106. Web servers 106 deliver content from resource databases 112 to query module 110 on client computing device 102. Content in resource databases 112 can include any data that that can be provided over network 108. Content within resource databases 112 is identified by a resource address that is associated with each web server 106. Content in resource databases 112 may include, for example, hypertext markup language (HTML) pages, word processing documents, portable document format (PDF) documents, images, video, and feed sources. Content in resource databases 112 can also include content, such as words, phrases, images and sounds that have embedded information (such as meta-information in hyperlinks) and/or embedded instructions (such as JavaScript scripts).

In an embodiment, each of the constituent parts of search engine system 100 may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium storage embodiments may include any physical medium which is capable of having instructions encoded thereon that may subsequently be used by one or more processors to implement methods described herein. Example physical media may include floppy discs, optical discs (e.g. CDs, mini-CDs, DVDs, HID-DVD, Blu-ray), hard drives, punch cards, tape drives, flash memory, and memory chips. However, any other type of tangible storage medium that can serve in the role of providing instructions to one or more processors may be used to store the instructions in these embodiments.

Figure 2:
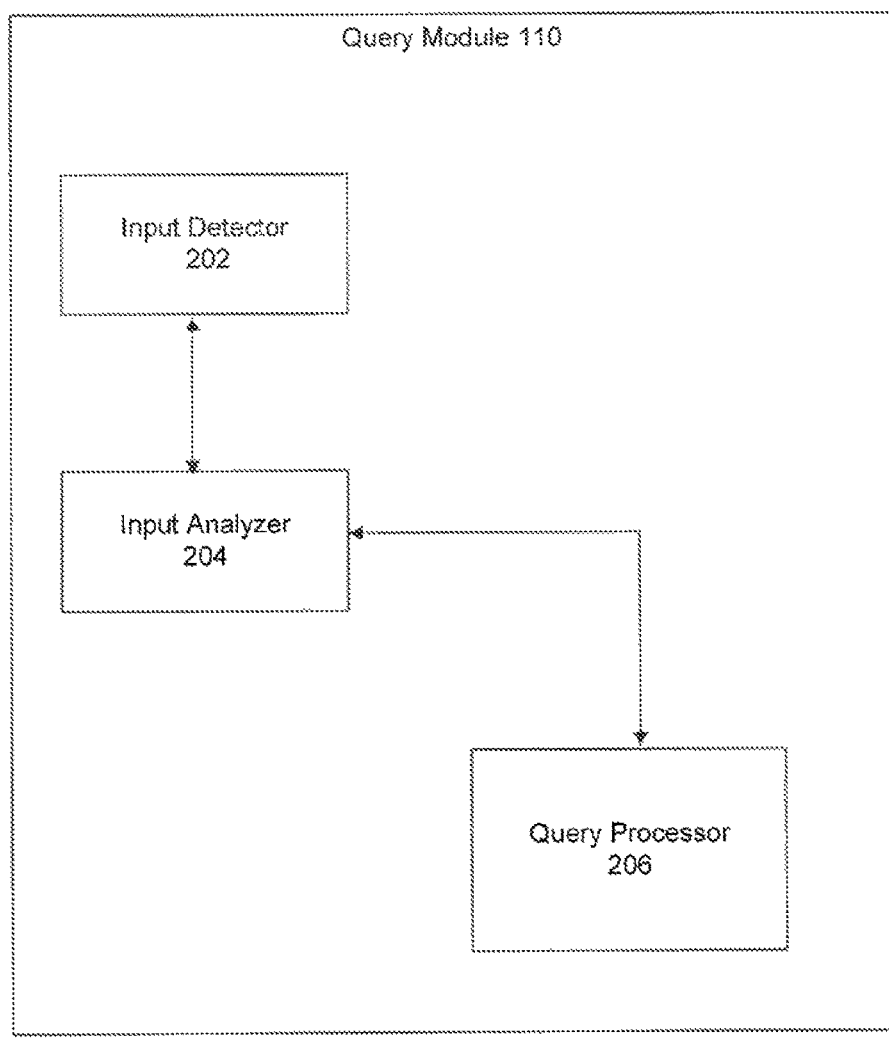
FIG. 2 is an illustration of a query manager, according to an embodiment.

FIG. 2 illustrates a query module 110 of a client computing device, according to embodiments. Query module 110 includes an input detector 202, input analyzer 204 and a query processor 206. Query module 110 may provide a search input field and a slider bar mechanism, according to embodiments. The search input field and slider bar may be configured to retrieve and refine a plurality of search query results based on user interaction. A user may enter a first input, such as a string of characters or a series of words and phrases into the search input field, which may be detected by input detector 202. Based on characteristics of the first input, input analyzer 204 is configured to identify a plurality of categories related to the first input. For example, each source table 114, DBMS 104 or web server 106 of FIG. 1 may be categorized. That is, information within each source of data is grouped based on common features. Thus, a web server may group information into categories such as "Entertainment," "Research" or "News," for example. If a database management system is related to a financial institution, the database management system may group information within its database tables into categories such as "Accounts" and "Securities," for example. As discussed previously, the retrieval of the plurality of categories is based on a model. According to an embodiment, a model generates a relevance score associated with a likelihood or probability that a user wants information from a particular category of information. Based on the model, a relevance score is assigned to each category associated with either a web servers or a database management system.

According to an embodiment, input analyzer 204 is configured to generate a model based on a set of criteria. Criteria are generated for a model based on characteristics of the first input. For example, input analyzer 204 may analyze the first input detected by input detector 202 to determine a relevance score for categories based on formatting or specific words of the first input. For example, a string representation in the format of "MM-DD-YYYY" can be analyzed by input analyzer 204 and determined to most likely be a date. Based on recognizing that the first input is most likely a date, input analyzer 204 is configured to identify and assign respective relevance scores to categories which may be related to the first input. For example, from a web server, query module 110 may find categories related to the first input, such as "Current or Historical Events" or "Zodiac" information. From a database management system, query module 110 may find categories that may include customer information that is searchable by a birth date, for example.

Input analyzer 204 can be configured to use additional information for generation of the model, such as prior user history, known characteristics of the searchable categories, or user customization regarding the types of categories, from which the user would like to retrieve information. During the generation of a model, a standard machine learning or statistical technique may be used to determine a relevance score or the probability that the user would like a list of search query results from a particular category, when the user provides a first input. Any of several well-known techniques may be used to generate the model, such as logic regression, boosted decision trees, random forests, support vector machines, and winnow learners. The model generates a relevance score which is assigned to each category, according to an embodiment. For example, an algorithm can be used to generate different relevance scores for each category associated with a web server or database management system. The algorithm can assign relevance scores in a range of 0.0 to 1.0, where 0.0 indicates that a category is completely unrelated to the first input entered by the user. Once relevance scores are assigned to categories, a relevance threshold may be used to determine which categories should be retrieved and potentially searched for information related to the first input. For example, a relevance threshold of 0.75 or 75% may be set by a user or developer. In such a scenario, only categories assigned a relevance score of 0.75 or above will be retrieved by input analyzes 204.

Once input analyzer 204 retrieves the plurality of categories based on the first input and the relevance scores associated with the categories of a web server and database management system, the retrieved categories are associated with different segments of a slider bar mechanism by query processor 206. A slider bar may be partitioned into segments based on the quantity of categories retrieved by input analyzer 204. For example, the slider may be partitioned and configured to operate at intervals. Every slide or movement of the slider button to the right or left can indicate an integer change of 1. Each interval of the slider can be linked to a retrieved category. Thus, when a user moves the slider, Boolean logic can be applied to notify the user which category will be searched and subsequently display a list of search query results from the associated category. As the user continues to move the slider to the left or right, search query results will change based on the category selected or associated with the position of the slider button. In this way, a user is able to achieve efficient and intuitive refinement of search query results. While embodiments have been described utilizing a slider bar, one skilled in the art will appreciate that embodiments are not limited to a slider bar. For example, categories may be generated and associated with different segments or portions of a circular spin-wheel (i.e. of a mobile device) or spiral-like search mechanism, where a user-interaction with the spin-wheel or spiral-like search mechanism results in different categories being searched.

Figure 3:
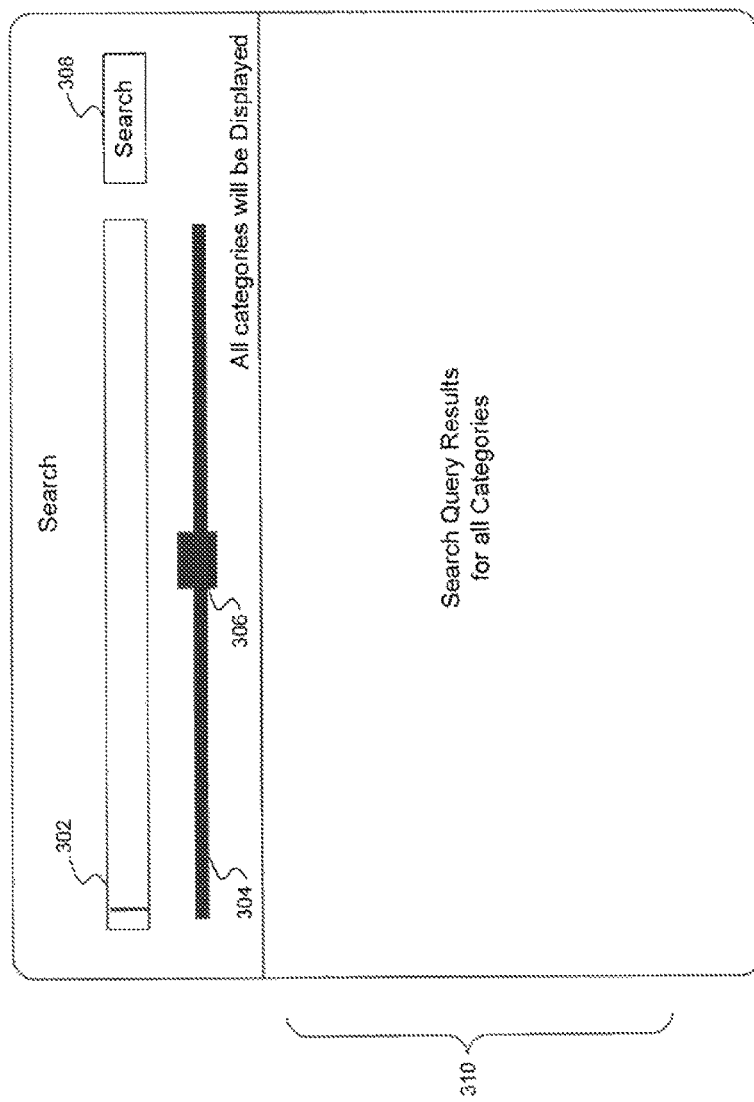
FIG. 3 is an illustration of an example display view of a system, according to an embodiment.

FIG. 3 illustrates an example display view 300 of a search engine system, according to embodiments. A user may enter, into text input field 302, a series of characters or search terms. In an embodiment, as the user enters text into text input field 302, search query results may automatically be displayed and refined within display view 310. In another embodiment, a user may complete entry of the first input within text input field 302 and then click search button 308, which will generate a search query and produce a list of search query results within display view 310. In this example, the user interface includes a slider 304 and a slider button 306. Slider 304 and slider button 306 are used to perform refinement of the search query results. As the user enters text into text input field 302, the characters may be parsed and a plurality of searchable categories may be retrieved. For example, the plurality of search categories can be retrieved based on a relevance score, as discussed previously. FIG. 3 illustrates slider button 306 at a default position, which can be the center of slider 304, according to embodiments. When slider button 306 is at default position, a search of all retrieved categories is performed. Thus, in this illustration, a set of query results based on a search of all retrieved categories will be displayed within display view 310.

Figure 4:
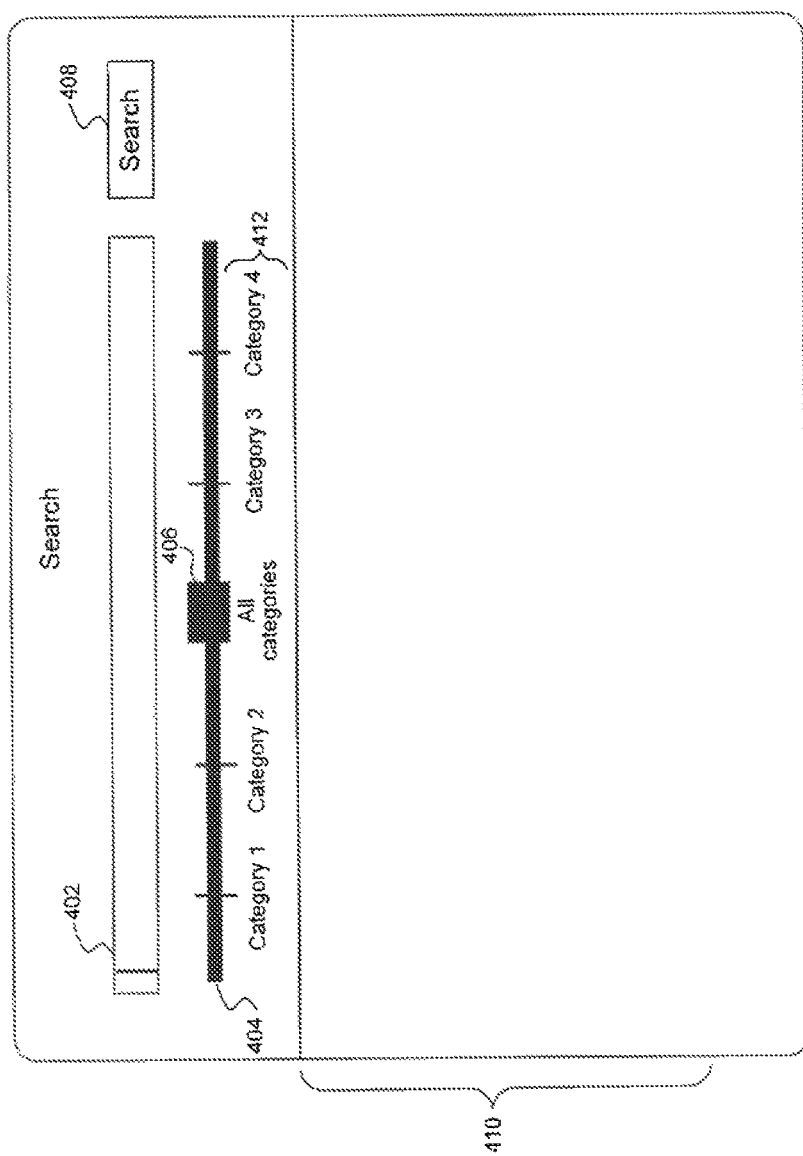
FIG. 4 is an illustration of an example display view of a system, according to an embodiment.

FIG. 4 illustrates another example display view 400 of a search engine system, according to embodiments. Similar to FIG. 3, search engine system includes a user interface comprising a text input field 402, a slider 404, slider button 406, a search button 408 and a display view 410. FIG. 4 also illustrates a plurality of categories 412, which have been retrieved based on characteristics of the first input and subsequently linked to slider 404. As illustrated, based on the first input provided by the user within text input field 402, four categories of information may be retrieved: "Category 1," "Category 2," "Category 3" and "Category 4." For example a user may enter a first input, such as the term "patents." The term "patents" along with other information related to the user activity may be sent to model, which will generate relevance scores for categories of information that may be stored in one or more webservers or database management systems. In the example above, the term "patents" may retrieve the following categories "Category 1: News," "Category 2: Research," "Category 3: U.S. patents," and "Category 4: International Patents." Category 1 and category 2 may be retrieved from web servers which include information related to patents such as current events, how to file a patent, or lists of searchable patent databases. Category 3 and Category 4 may be returned from database management systems which stores various information related to filed and issued U.S. and international patent applications. FIG. 4 illustrates that slider 404 is partitioned into segments based on the quantity of the retrieved plurality of categories. Each partition or segment is linked to a corresponding category, according to an embodiment.

Figure 5:
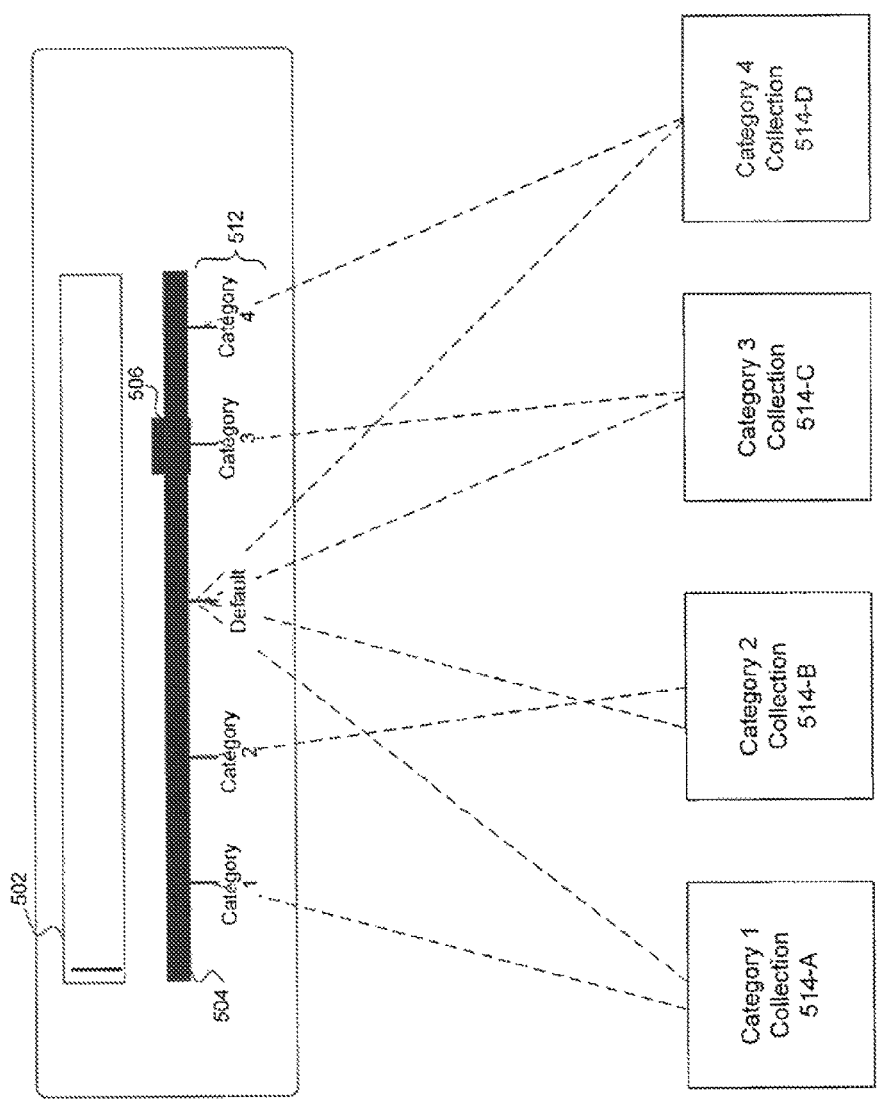
FIG. 5 is an illustration of an example display view of a system, according to an embodiment.

FIG. 5 illustrates the mapping of categories to different segments of the slider. As with FIG. 3 and FIG. 4, search engine system 500 includes a text input field 502, a slider 504 and a slider button 506. FIG. 5 illustrates a one-to-one mapping between the plurality of categories 512 assigned and linked to slider 504 and the respective category collections 514-A, 514-B, 514-C and 514-D associated with each category. Category collections 514 include the data which will be searched when a user enters input into text input field 502 and utilizes slider button 506. For example, when a user moves slider button 506 to a first position such as "Category 3," a search query will be generated and corresponding category collection 514-C will be searched for search query results which will be displayed to the user. As the user continues to move slider button 506 along slider 504, different category collections are searched based on the position of the slider button. If slider button 506 is positioned at the "Default" position, all category collections 514 will be searched for search query results, according to an embodiment.

Figure 6:
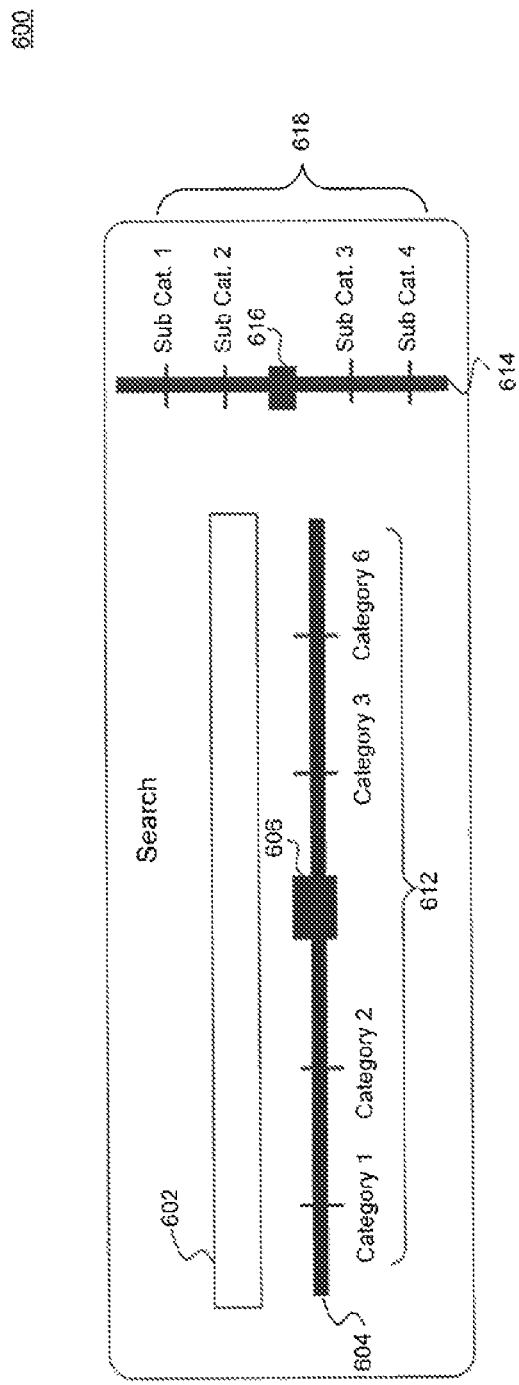
FIG. 6 is an illustration of an example display view and system, according to an embodiment.
Figure 7:
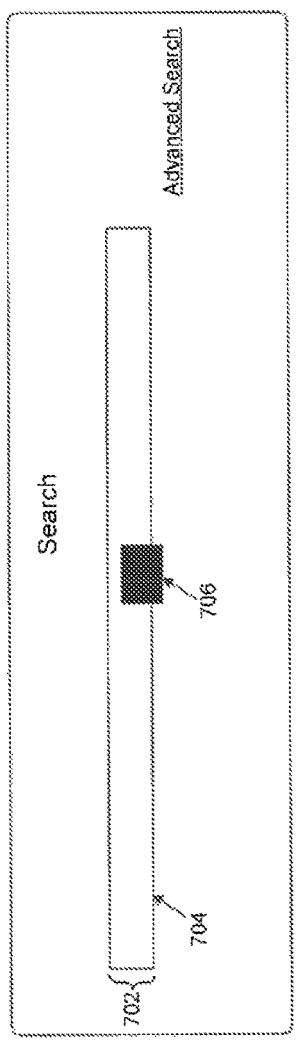
FIG. 7 is an illustration of an example display view of a system, according to an embodiment.

FIG. 6 illustrates another example display view 600 of a search engine system, according to embodiments. The user interface of the search engine system includes a text input field 602, a first slider 604 with a first slider button 606 and a second slider 614 with a second slider button 616. Similar to FIG. 3, FIG. 4 and FIG. 5 discussed above, first slider 604 may be partitioned into different segments and each segment can be linked and associated with a category from a plurality of retrieved categories 612. In an embodiment, each category may be associated with a plurality of sub categories 618. For example, "Category 1," which may be associated with a "Securities" category of a financial database system, can include several subcategories 618. The subcategories 618 may relate to different kinds of securities such as "Notes," "Stocks," "Treasuries" or "Bonds." The subcategories 618 may be retrieved and assigned to second slider 614 based on similar techniques used to assign categories to first slider 604, which has been discussed previously. Based on the assignment of subcategories 618 to different segments of second slider 614, a user may move slider button 616 "up" or "down" to different subcategories 618. The search query results will be filtered and refined even further based on such user interaction. Thus, a user may refine the search query results in order to get more specific information related to a category. FIG. 7 illustrates the first and second slider bars as separate sliders, however one skilled in the art will appreciate that embodiments are not limited to this example. For example, the first slider bar and second bar may overlap creating a quadrant-like or graph-like search mechanism. As the user moves the slider button along the x-axis, y-axis, or within any of the quadrants, search query results may be refined and filtered to provide different levels of detail. Additionally embodiments are not limited to two slider bars, as illustrated. Any number of slider bars may be provided with segments of each slider bar being assigned respective categories and sub-categories. Such a mechanism allows a user to even further refine a set of search query results.

As mentioned previously, embodiments may be performed using a mobile device, such as a cell phone or tablet computer device with a touch screen. When such devices are used, it may be difficult for a user to operate a search engine system, due to the small size of the display portion of the device. Embodiments can provide space saving benefits by combining the text input field and the slider bar mechanism. FIG. 7 illustrates another example display view 700 of the search engine system, according to embodiments. Here, search object 702 includes both a text input field and the slider bar 704 with a slider button 706. Additionally, the user interface does not include a search button and searches can be performed asynchronously as users type, according to embodiments. In this way it is easier for the end user on mobile devices to perform fast search queries and helps reduce "click events" which may be harder to perform on a mobile device due to the small display sire.

Overview of the Method

Figure 8:
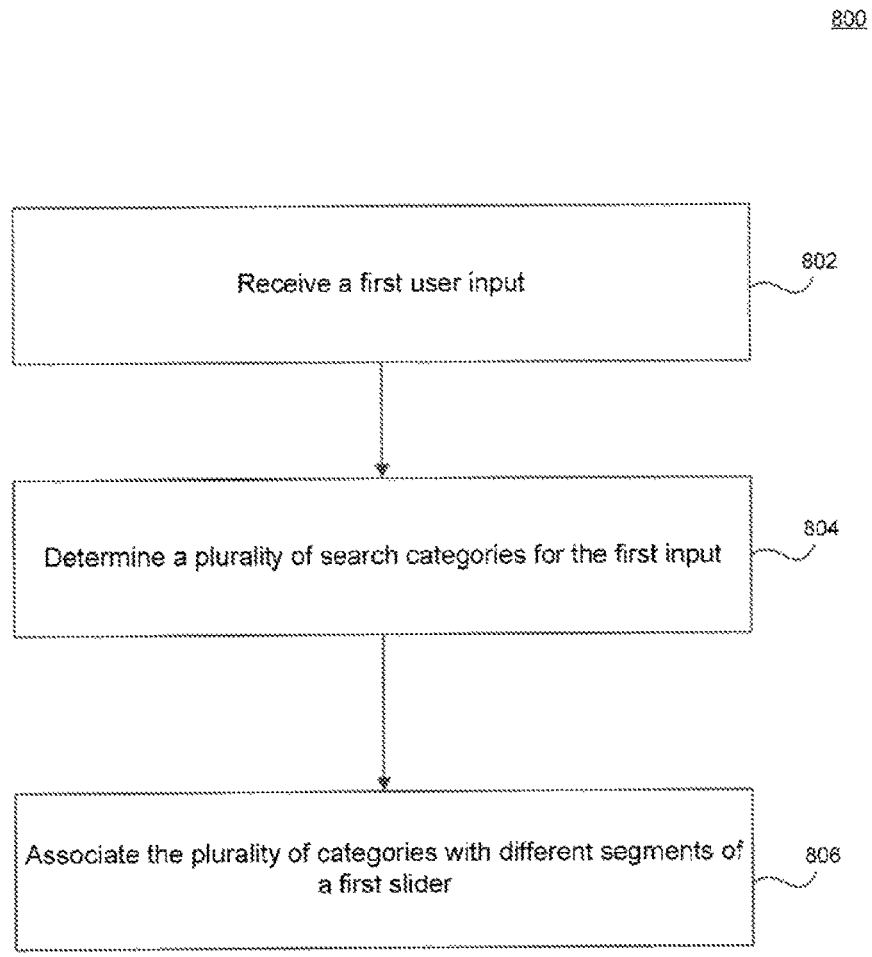
FIG. 8 is a flow diagram of an example method of operation, according to an embodiment.

FIG. 8 is a flow diagram of an example method of operation for refining search query results, according to embodiments.

At step 802, a first input from a text input field of a search engine or searchable database system is received. For example, a first input is received and detected by query module 110 of client computing device 102. The first input received may be received in response to a user entering a string of characters in a text input field of query module 110.

At step 804, a plurality of search categories are determined based on the first input. For example, step 804 may be performed by query module 110 of client computing device 102. Based on characteristics of the first input, such as formatting or types of key words, a plurality of categories related to the first input is identified. For example, a user may enter a first input such as the term "hurricane." The first input may then be looked up in a dictionary. According to embodiments, a client computing device may store a local dictionary for keyword lookups or use a web-based dictionary. The dictionary lookup will return a definition or identifiers for the first input and the identifiers can be used to create criteria upon which categories will be identified. Based on the example above, categories such as "News," "Weather," "Sports" or "Cocktails" may be returned for a first input of "hurricane."

Query module 110 is configured to communicate with one or more web servers or database management systems in order to retrieve the plurality of categories. The retrieval of the plurality of categories is based on a model which generates a relevance score associated with a probability that a user would like search query results from a particular database. Based on the model, a relevance score is assigned to each category associated with a web server or database management system. In another embodiment, relevance scores may be assigned directly to a web server or database management system. During the generation of a model, a standard machine learning or statistical technique, such as logic regression may be used to determine a relevance score, according to embodiments. The model is configured to generate a relevance score which is assigned to each category or source of data, according to an embodiment. For example, an algorithm can be used to generate different relevance scores for each web server and database management system or each category of the respective sources of data. The algorithm can assign relevance scores in a range of 0.0 to 1.0, where 1.0 indicates that a category is highly related to the first input entered by the user. Once relevance scores are assigned to categories, a relevance threshold is used to determine which sources of data or categories are retrieved.

At step 806, the plurality of categories are associated with different segments of a first slider. For example, step 806 may be performed by query module 110 of client computing device 102. Once the plurality of categories are retrieved based on the first input, the retrieved categories are associated with different segments of a slider bar. A slider bar may be segmented based on the quantity of categories included in the plurality of retrieved categories. Thus, each segment of the slider bar can be linked to a retrieved category. Hence, when a user moves the slider to different positions along the slider bar, different categories may be searched and search query results may be refined. In this way, a user is able to achieve efficient and intuitive refinement of search query results.

Figure 9:
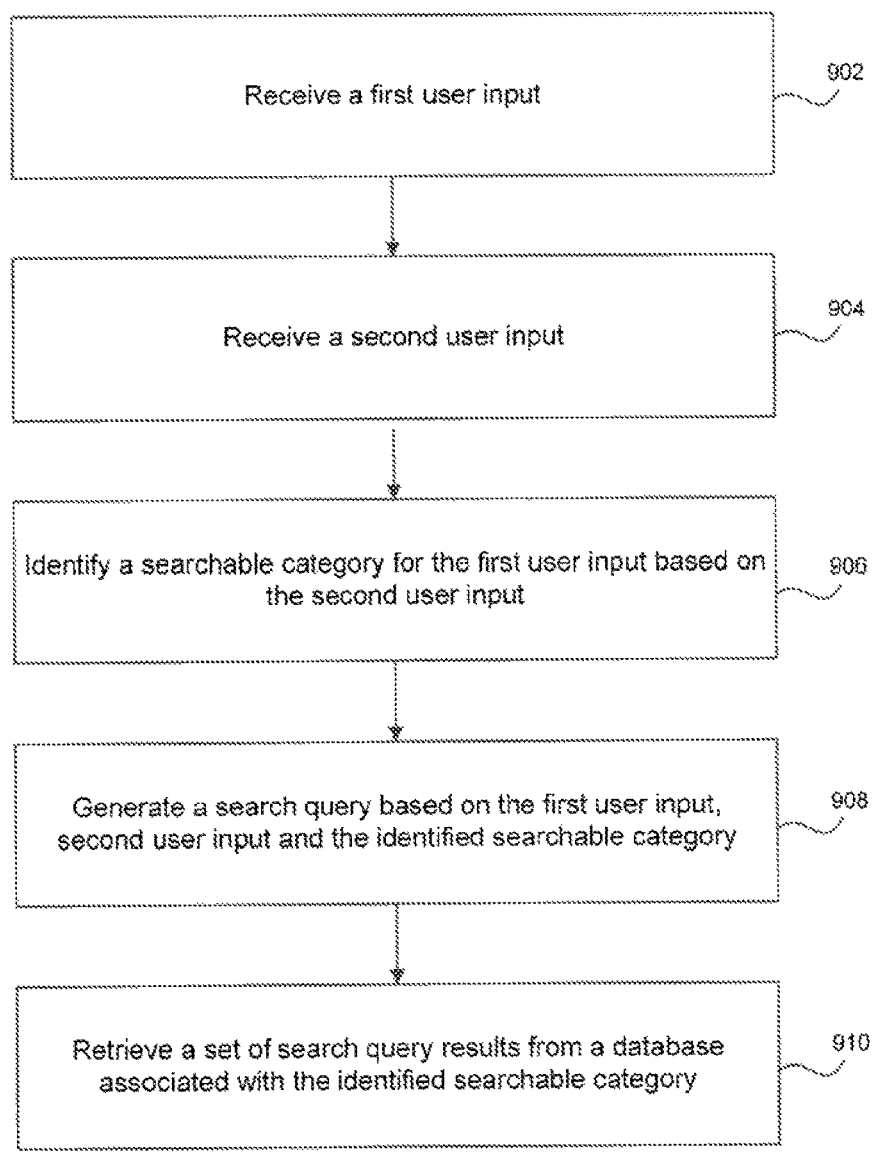
FIG. 9 is a flow diagram of an example method of operation, according to an embodiment.

FIG. 9 is a flow diagram of an example method of operation for refining search query results, according to embodiments.

At step 902, a first user input is received. Step 902 is similar to step 802 of FIG. 8 and likewise may be performed by query module 110 of client computing device 102.

At step 904, a second user input is received. Step 904 may be performed by query module 110 of client computing device 102. A second user input may comprise a user moving a slider button of a first slider to a first position of a slider bar. For example, a slider bar may be partitioned into different segments. A user may move the slider button of the slider bar along the slider bar and position it at the various segments, according to embodiments.

At step 906, a searchable category for the first user input is identified based on the second user input. Step 906 may be performed by query module 110 of client computing device 102. As discussed above with respect to step 806 of FIG. 8, each segment of a partitioned slider bar may be linked and associated with a different category. The category determines which server(s) and database(s) are searched in order to retrieve search query results. As a user moves a slider button along the slider to different positions, criteria for the search query will change based on the category linked to the position of the slider button.

At step 908, a search query is generated based on the first user input, second user input and the identified search category. Step 908 may be performed by query module 110 of client computing device 102. Upon entering of a first input and subsequent movement of the slider as a second input, a search of the identified search category is performed. An identified search category may be associated with one or more databases. For example, if the search category is "News," different news servers may be searched.

At step 910, a set of search query results is retrieved from a database associated with the identified searchable category. Step 910 may be performed by query module 110 of client computing device 102. Upon generation of the search query during step 906, a list of search query results may be presented to the user based on information retrieved from the associated databases or servers. Further refinement and updating of the search query results may be performed based on changing of parameters of the first input, further movement of the slider bar, or movement of an additional slider bar, as discussed previously.

Example Computer System

Figure 10:
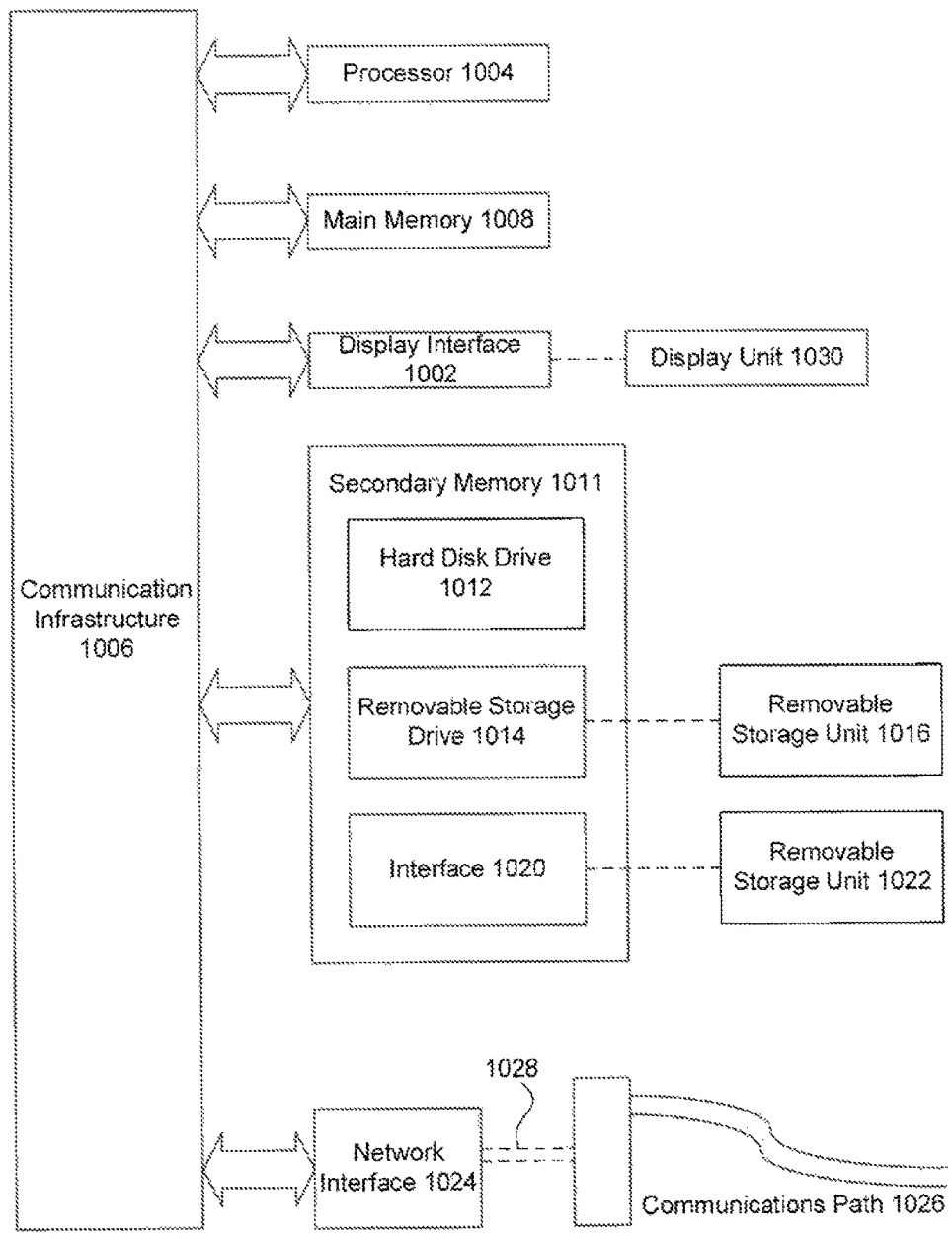
FIG. 10 is a diagram of an example system that may be used to implement embodiments disclosed herein.

Various embodiments can be implemented, for example, using one or more well-known computer systems, such as computer system 1000 shown in FIG. 10. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1000 also includes user input/output device(s), such as monitors, keyboards, pointing devices, etc., which communicate with communication infrastructure 1006 through user input/output interface(s).

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Network interface 1024 enables computer system 1000 to communicate and interact with any combination of remote devices, remote networks, remote entities, etc. (individually and collectively referenced by reference number 1028). For example, network interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 10. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented method, comprising:
   in response to receiving, by a client computing device, a first user input:
   assigning, by the client computing device, relevance scores to a plurality of different search categories based on an analysis of a format and type of the first user input in relation to the plurality of different search categories;
   retrieving, by the client computing device, a subset of the plurality of different search categories, wherein the relevance scores assigned to each of the search categories of the subset of the plurality of different search categories exceed a pre-configured relevance threshold;
   partitioning, by the client computing device, a first slider into a first plurality of separate segments based on the subset of the plurality of different search categories, wherein a quantity of the first plurality of separate segments of the first slider is greater than a quantity of the subset of the plurality of different search categories;
   assigning each search category of the subset of the plurality of different search categories to at least one segment of the first plurality of separate segments of the first slider, wherein the assigned search categories change based on different user inputs and wherein a first search category of the subset of the plurality of different search categories is assigned to a first segment of the first plurality of separate segments; and
   displaying the first slider, including a first slider button initially positioned at a first default segment of the first plurality of separate segments of the first slider;

in response to receiving, by the client computing device, a second user input that moves the first slider button from the first default segment to the first segment:
displaying a first set of search results based on (i) the first user input and (ii) the first search category;
determining, by the client computing device, a plurality of search sub-categories of the first search category;
partitioning, by the client computing device, a second slider into a second plurality of separate segments based on the plurality of search sub-categories, wherein a quantity of the second plurality of separate segments of the second slider is greater than a quantity of the plurality of search sub-categories;
assigning each sub-category of the plurality of search sub-categories to at least one segment of the second plurality of separate segments of the second slider, wherein a first search sub-category of the plurality of search sub-categories is assigned to a second segment of the second plurality of separate segments; and
displaying the second slider, including a second slider button initially positioned at a second default segment of the second plurality of separate segments of the second slider; and
in response to receiving, by the client computing device, a third user input that moves the second slider button from the second default segment to the second segment, displaying a second set of search results based on (i) the first user input, (ii) the first search category, and (iii) the first search sub-category.

2. The computer-implemented method of claim 1, further comprising, in response to receiving, by the client computing device, the second user input:
generating, by the client computing device, a search query for the first user input based on the second user input; and
receiving, by the client computing device, a set of search query results for the first user input based on the second user input.

3. The computer-implemented method of claim 2, further comprising, in response to receiving, by the client computing device, one or more additional user inputs, wherein each additional user input comprises additional movements of the first slider button of the first slider to different separate segments of the first slider, updating the search query results for each additional user input based on searches of the subset of the plurality of different search categories associated with the different separate segments of the first slider.

4. The computer-implemented method of claim 1, wherein the receiving a first user input comprises:
receiving, by the client computing device, one or more search terms; and
parsing, by the client computing device, the one or more search terms.

5. The computer-implemented method of claim 4, wherein retrieving a subset of the plurality of different search categories for the first user input comprises:
analyzing, by the client computing device, the parsed one or more search terms;
determining, by the client computing device, one or more category types for the parsed one or more search terms based on the analysis; and
retrieving, by the client computing device, the subset of the plurality of different search categories based on a match with the one or more category types.

6. The computer-implemented method of claim 5, wherein determining one or more category types comprises:

generating, by the client computing device, criteria for a model based on characteristics of the first user input, wherein the model assigns the relevance score to each of the search categories of the plurality of different search categories.

7. The computer-implemented method of claim 1, wherein the first user input comprises personal information.

8. The computer-implemented method of claim 1, wherein the first user input comprises user account information, customer identification number, first name, last name, a social security number, or a date of birth.

9. The computer-implemented method of claim 1, wherein assigning relevance scores is not based on the content of the first user input.

10. The computer-implemented method of claim 1, wherein the search categories comprise a plurality of different databases and a plurality of different web servers.

11. The computer-implemented method of claim 1, further comprising, in response to receiving the third user input, querying a database table associated with the first search sub-category.

12. The computer-implemented method of claim 1, wherein:
each search category of the subset of the plurality of different search categories is assigned to the first default segment, and
for each segment in the first plurality of separate segments other than the first default segment, exactly one of the subset of the plurality of different search categories is assigned to the segment.

13. The computer-implemented method of claim 12, wherein the first default segment is positioned in the center of the first slider.

14. The computer-implemented method of claim 13, wherein:
the first plurality of separate segments is an odd number, and
an equal number of the first plurality of separate segments is positioned on either side of the first default segment along the first slider.

15. The computer-implemented method of claim 1, wherein:
each sub-category of the plurality of search sub-categories is assigned to the second default segment, and
for each segment in the second plurality of separate segments other than the second default segment, exactly one of the plurality of search sub-categories is assigned to the segment.

16. The computer-implemented method of claim 15, wherein the second default segment is positioned in the center of the second slider.

17. The computer-implemented method of claim 16, wherein:
the second plurality of separate segments is an odd number, and
an equal number of the second plurality of separate segments is positioned on either side of the second default segment along the second slider.

18. A system, comprising:
a computing device comprising a processor and memory; and
a query module, implemented on the computing device, and configured to:
receive a first user input;
assign relevance scores to a plurality of different search categories based on an analysis of a format and type of the first user input in relation to the plurality of different search categories;
retrieve a subset of the plurality of different search categories, wherein the relevance scores assigned to each of the search categories of the subset of the plurality of different search categories exceed a pre-configured relevance threshold;
partition a first slider into a first plurality of separate segments based on the subset of the plurality of different search categories, wherein a quantity of the first plurality of separate segments of the first slider is greater than a quantity of the subset of the plurality of different search categories;
assign each search category of the subset of the plurality of different search categories to at least one segment of the first plurality of separate segments of the first slider, wherein the assigned search categories change based on different user inputs and wherein a first search category of the subset of the plurality of different search categories is assigned to a first segment of the first plurality of separate segments;
display the first slider, including a first slider button initially positioned at a first default segment of the first plurality of separate segments of the first slider;
in response to receiving a second user input that moves the first slider button from the first default segment to the first segment:
  display a first set of search results based on (i) the first user input and (ii) the first search category;
  determine a plurality of search sub-categories of the first search category;
  partition a second slider into a second plurality of separate segments based on the plurality of search sub-categories, wherein a quantity of the second plurality of separate segments of the second slider is greater than a quantity of the plurality of search sub-categories;
  assign each sub-category of the plurality of search sub-categories to at least one segment of the second plurality of separate segments of the second slider, wherein a first search sub-category of the plurality of search sub-categories is assigned to a second segment of the second plurality of separate segments; and
  display the second slider, including a second slider button initially positioned at a second default segment of the second plurality of separate segments of the second slider; and
  in response to receiving a third user input that moves the second slider button from the second default segment to the second segment, display a second set of search results based on (i) the first user input, (ii) the first search category, and (iii) the first search sub-category.

19. The system of claim 18, wherein the query module is further configured to:
generate a search query for the first user input based on the second user input; and
receive a set of search query results for the first user input based on the second user input.

20. The system of claim 19, wherein the query module is further configured to:
receive one or more additional user inputs, wherein each additional user input comprises additional movements of the first slider button of the first slider to different separate segments of the first slider; and
update the search query results for each additional user input based on searches of the search categories associated with the different separate segments of the first slider.

21. The system of claim 19, wherein the query module is further configured to:
receive one or more search terms; and
parse the one or more search terms.

22. The system of claim 21, wherein the query module is further configured to:
analyze the parsed one or more search terms;
determine one or more category types for the parsed one or more search terms based on the analysis; and
retrieve the subset of the plurality of different search categories based on a match with the one or more category types.

23. The system of claim 22, wherein the query module is further configured to:
generate criteria for a model based on characteristics of the first user input, wherein the model assigns the relevance score to each of the plurality of different search categories.

24. A non-transitory computer-readable storage medium storing instructions executable by one or more computers which, upon execution, cause the one or more computers to perform operations comprising:
in response to receiving a first user input:
  assigning relevance scores to a plurality of different search categories based on an analysis of a format and type of the first user input in relation to the plurality of different search categories;
  retrieving a subset of the plurality of different search categories, wherein the relevance scores assigned to each of the search categories of the subset of the plurality of different search categories exceed a pre-configured relevance threshold;
  partitioning a first slider into a first plurality of separate segments based on the subset of the plurality of different search categories, such that a quantity of the first plurality of separate segments of the first slider is greater than a quantity of the subset of the plurality of different search categories;
  assigning each search category of the subset of the plurality of different search categories to at least one segment of the first plurality of separate segments of the first slider, wherein the assigned search categories change based on different user inputs and wherein a first search category of the subset of the plurality of different search categories is assigned to a first segment of the first plurality of separate segments; and
  displaying the first slider, including a first slider button initially positioned at a first default segment of the first plurality of separate segments of the first slider;
in response to receiving a second user input that moves the first slider button from the first default segment to the first segment:
  displaying a first set of search results based on (i) the first user input and (ii) the first search category;
  determining a plurality of search sub-categories of the first search category;
  partitioning a second slider into a second plurality of separate segments based on the plurality of search sub-categories, wherein a quantity of the second plurality of separate segments of the second slider is greater than a quantity of the plurality of search sub-categories;

assigning each sub-category of the plurality of search sub-categories to at least one segment of the second plurality of separate segments of the second slider, wherein a first search sub-category of the plurality of search sub-categories is assigned to a second segment of the second plurality of separate segments; and displaying the second slider, including a second slider button initially positioned at a second default segment of the second plurality of separate segments of the second slider; and in response to receiving a third user input that moves the second slider button from the second default segment to the second segment, displaying a second set of search results based on (i) the first user input, (ii) the first search category, and (iii) the first search sub-category.

25. The non-transitory computer-readable storage medium of claim 24, the operations further comprising:
generating a search query for the first user input based on the second user input; and
receiving a set of search query results for the first user input based on the second user input.

26. The non-transitory computer-readable storage medium of claim 25, the operations further comprising:
receiving one or more additional user inputs, each additional user input comprising additional movements of the first slider button of the first slider to different segments of the first slider; and
updating the search query results for each additional user input based on searches of the search categories associated with the different segments of the first slider.

27. The non-transitory computer-readable storage medium of claim 24, wherein:
each search category of the subset of the plurality of different search categories is assigned to the first default segment, and
for each segment in the first plurality of separate segments other than the first default segment, exactly one of the subset of the plurality of different search categories is assigned to the segment.

28. The non-transitory computer-readable storage medium of claim 27, wherein the first default segment is positioned in the center of the first slider.

29. The non-transitory computer-readable storage medium of claim 28, wherein:
the first plurality of separate segments is an odd number, and
an equal number of the first plurality of separate segments is positioned on either side of the first default segment along the first slider.

30. The non-transitory computer-readable storage medium of claim 24, wherein:
each sub-category of the plurality of search sub-categories is assigned to the second default segment, and
for each segment in the second plurality of separate segments other than the second default segment, exactly one of the plurality of search sub-categories is assigned to the segment.

31. The non-transitory computer-readable storage medium of claim 30, wherein the second default segment is positioned in the center of the second slider.

32. The non-transitory computer-readable storage medium of claim 31, wherein:
the second plurality of separate segments is an odd number, and
an equal number of the second plurality of separate segments is positioned on either side of the second default segment along the second slider.

33. An apparatus, comprising:
a memory; and
a processing device coupled to the memory, wherein the processing device is configured to:
receive a first user input;
assign relevance scores to a plurality of different search categories based on an analysis of a format and type of the first user input in relation to the plurality of different search categories;
retrieve a subset of the plurality of different search categories, wherein the relevance scores assigned to each of the search categories of the subset of the plurality of different search categories exceed a pre-configured relevance threshold;
partition a first slider into a first plurality of separate segments based on the subset of the plurality of different search categories, wherein a quantity of the first plurality of separate segments of the first slider is greater than a quantity of the subset of the plurality of different search categories;
assign each search category of the subset of the plurality of different search categories to at least one segment of the first plurality of separate segments of the first slider, wherein the assigned search categories change based on different user inputs and wherein a first search category of the subset of the plurality of different search categories is assigned to a first segment of the first plurality of separate segments;
display the first slider, including a first slider button initially positioned at a first default segment of the first plurality of separate segments of the first slider;
receive a second user input that moves the first slider button from the first default segment to the first segment;
display a first set of search results based on (i) the first user input and (ii) the first search category;
determine a plurality of search sub-categories of the first search category;
partition a second slider into a second plurality of separate segments based on the plurality of search sub-categories, wherein a quantity of the second plurality of separate segments of the second slider is greater than the quantity of the plurality of search sub-categories;
assign each sub-category of the plurality of search sub-categories to at least one segment of the second plurality of separate segments of the second slider, wherein a first search sub-category of the plurality of search sub-categories is assigned to a second segment of the second plurality of separate segments;
display the second slider, including a second slider button initially positioned at a second default segment of the second plurality of separate segments of the second slider;
receive a third user input that moves the second slider button from the second default segment to the second segment; and
display a second set of search results based on (i) the first user input, (ii) the first search category, and (iii) the first search sub-category.

34. The apparatus of claim 33, wherein:

each search category of the subset of the plurality of different search categories is assigned to the first default segment, and for each segment in the first plurality of separate segments other than the first default segment, exactly one of the subset of the plurality of different search categories is assigned to the segment.

35. The apparatus of claim 34, wherein the first default segment is positioned in the center of the first slider.

36. The apparatus of claim 35, wherein:

the first plurality of separate segments is an odd number, and an equal number of the first plurality of separate segments is positioned on either side of the first default segment along the first slider.

37. The apparatus of claim 33, wherein:

each sub-category of the plurality of search sub-categories is assigned to the second default segment, and for each segment in the second plurality of separate segments other than the second default segment, exactly one of the plurality of search sub-categories is assigned to the segment.

38. The apparatus of claim 37, wherein the second default segment is positioned in the center of the second slider.

39. The apparatus of claim 38, wherein:

the second plurality of separate segments is an odd number, and an equal number of the second plurality of separate segments is positioned on either side of the second default segment along the second slider.

* * * * *